(12) United States Patent
Ouyang

(10) Patent No.: US 8,368,835 B2
(45) Date of Patent: Feb. 5, 2013

(54) GROUNDING MECHANISM FOR LIQUID CRYSTAL MODULE

(75) Inventor: Zhi-Bin Ouyang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 337 days.

(21) Appl. No.: 12/771,274

(22) Filed: Apr. 30, 2010

(65) Prior Publication Data

US 2011/0075064 A1 Mar. 31, 2011

(30) Foreign Application Priority Data

Sep. 25, 2009 (CN) .......................... 2009 1 0307788

(51) Int. Cl.
*G02F 1/1335* (2006.01)
(52) U.S. Cl. ........................................... 349/58; 349/56
(58) Field of Classification Search .................. 349/58, 349/56
See application file for complete search history.

(56) References Cited

U.S. PATENT DOCUMENTS

| | | | | |
|---|---|---|---|---|
| 5,719,739 | A * | 2/1998 | Horiguchi ...................... | 361/220 |
| 6,028,761 | A * | 2/2000 | Cooter ........................... | 361/212 |
| 6,122,704 | A * | 9/2000 | Hass et al. ..................... | 711/100 |
| 6,765,453 | B2 * | 7/2004 | Yamaguchi et al. ........... | 333/24.2 |
| 7,121,874 | B1 * | 10/2006 | Jeon ................................ | 439/495 |
| 7,121,889 | B1 * | 10/2006 | Jeon ............................. | 439/607.1 |
| 7,184,808 | B2 * | 2/2007 | Shoji ........................... | 455/575.7 |
| 7,190,053 | B2 * | 3/2007 | Orth et al. ..................... | 257/659 |
| 7,557,776 | B2 * | 7/2009 | Inoue et al. .................... | 345/60 |
| 2002/0185659 | A1 * | 12/2002 | Yamaguchi et al. .......... | 257/200 |
| 2004/0106428 | A1 * | 6/2004 | Shoji .......................... | 455/550.1 |
| 2005/0024500 | A1 * | 2/2005 | Katayama ................ | 348/207.99 |
| 2005/0109669 | A1 * | 5/2005 | Burns et al. .................. | 206/711 |
| 2005/0139003 | A1 * | 6/2005 | Cochran et al. ................ | 73/313 |
| 2005/0237275 | A1 * | 10/2005 | Inoue et al. ..................... | 345/60 |
| 2006/0040520 | A1 * | 2/2006 | Moh .............................. | 439/66 |
| 2007/0211711 | A1 * | 9/2007 | Clayton ......................... | 370/360 |
| 2009/0154050 | A1 * | 6/2009 | Cheung et al. ................. | 361/117 |
| 2011/0075064 | A1 * | 3/2011 | Ouyang .......................... | 349/58 |

* cited by examiner

*Primary Examiner* — K. Cyrus Kianni
(74) *Attorney, Agent, or Firm* — Altis Law Group, Inc.

(57) ABSTRACT

A grounding mechanism is used for an electronic device. The electronic device includes a liquid crystal module and a housing. The grounding mechanism includes a first conductive element, a second conductive element and an elastic member. The first conductive element is attached to the liquid crystal module. The second conductive element is attached to the housing. The elastic member includes a main base, a resisting portion and a latching portion. The main base is received in the housing. The resisting portion is electronically connected to the second conductive element. The latching portion is electronically connected to the first conductive element.

8 Claims, 6 Drawing Sheets

GROUNDING MECHANISM FOR LIQUID CRYSTAL MODULE

BACKGROUND

1. Technical Field

The present disclosure relates to grounding mechanisms and, particularly, to a grounding mechanism used with a liquid crystal module.

2. Description of Related Art

Electronic devices usually include a liquid crystal module for displaying information. Electromagnetic interference and electrostatic charges are easily produced when the liquid crystal module is used. A conventional grounding structure adopts a flexible printed circuit (FPC) for conducting electromagnetic interference and electrostatic charges therefrom.

However, the FPC needs to be bent at several places to connect the liquid crystal module to a printed circuit board (PCB), which complicates the assembly process. In addition, the FPC is not very strong and may be too easily damaged should the electronic device be dropped.

Therefore, there is room for improvement within the art.

BRIEF DESCRIPTION OF THE DRAWINGS

Many aspects of the grounding mechanism can be better understood with reference to the following drawings. The components in the drawings are not necessarily drawn to scale, the emphasis instead being placed upon clearly illustrating the principles of the present grounding mechanism. Moreover, in the drawings, like reference numerals designate corresponding parts throughout the several views.

DETAILED DESCRIPTION

The present grounding mechanism may be applied in many different electronic devices such as mobile phones, game devices, PDAs (personal digital assistant) and others. In an illustrated embodiment, the grounding mechanism is used in a mobile phone.

Figure 1:
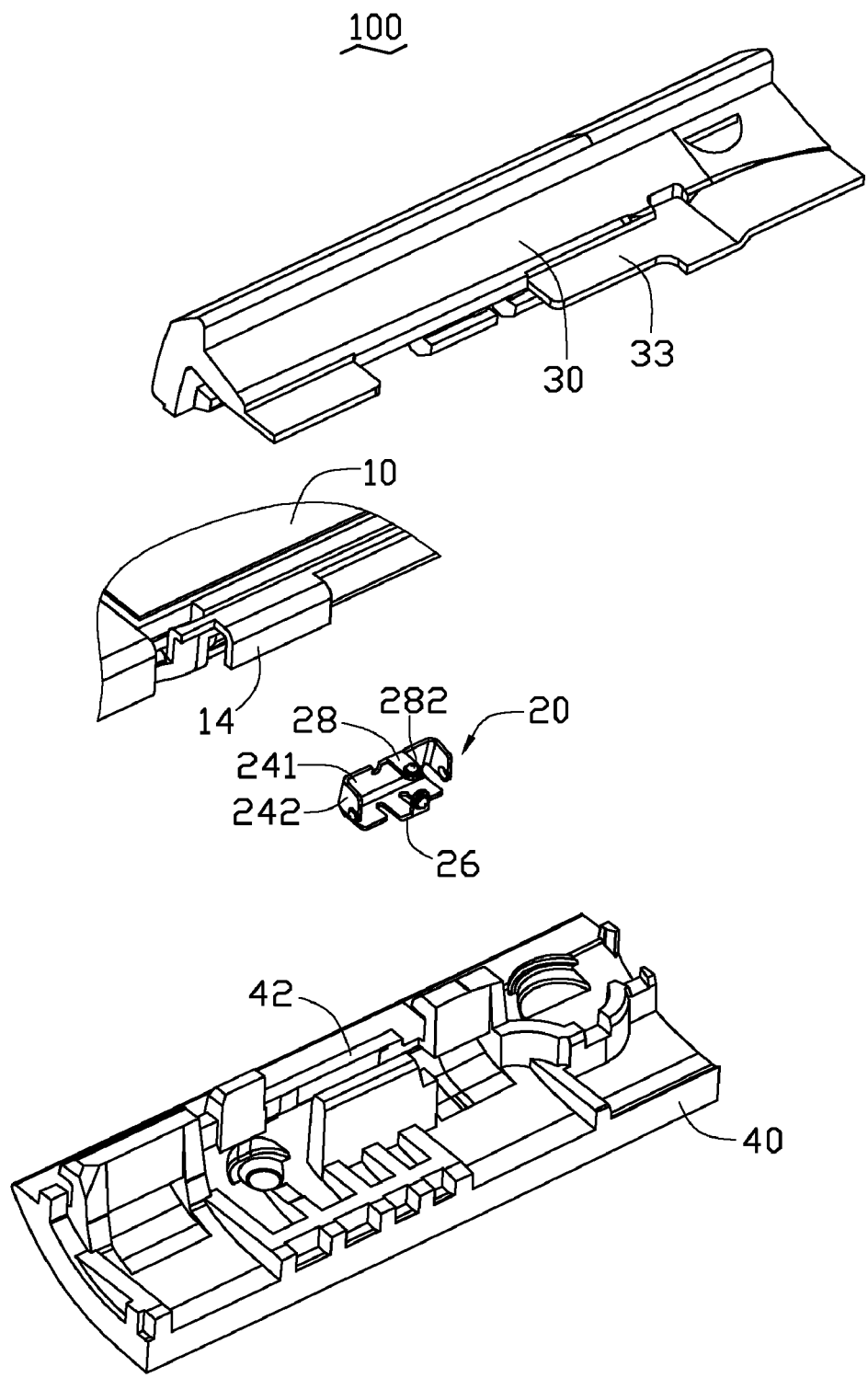
FIG. 1 is an exploded, isometric view of an electronic device using a grounding mechanism in accordance with an exemplary embodiment.
Figure 2:
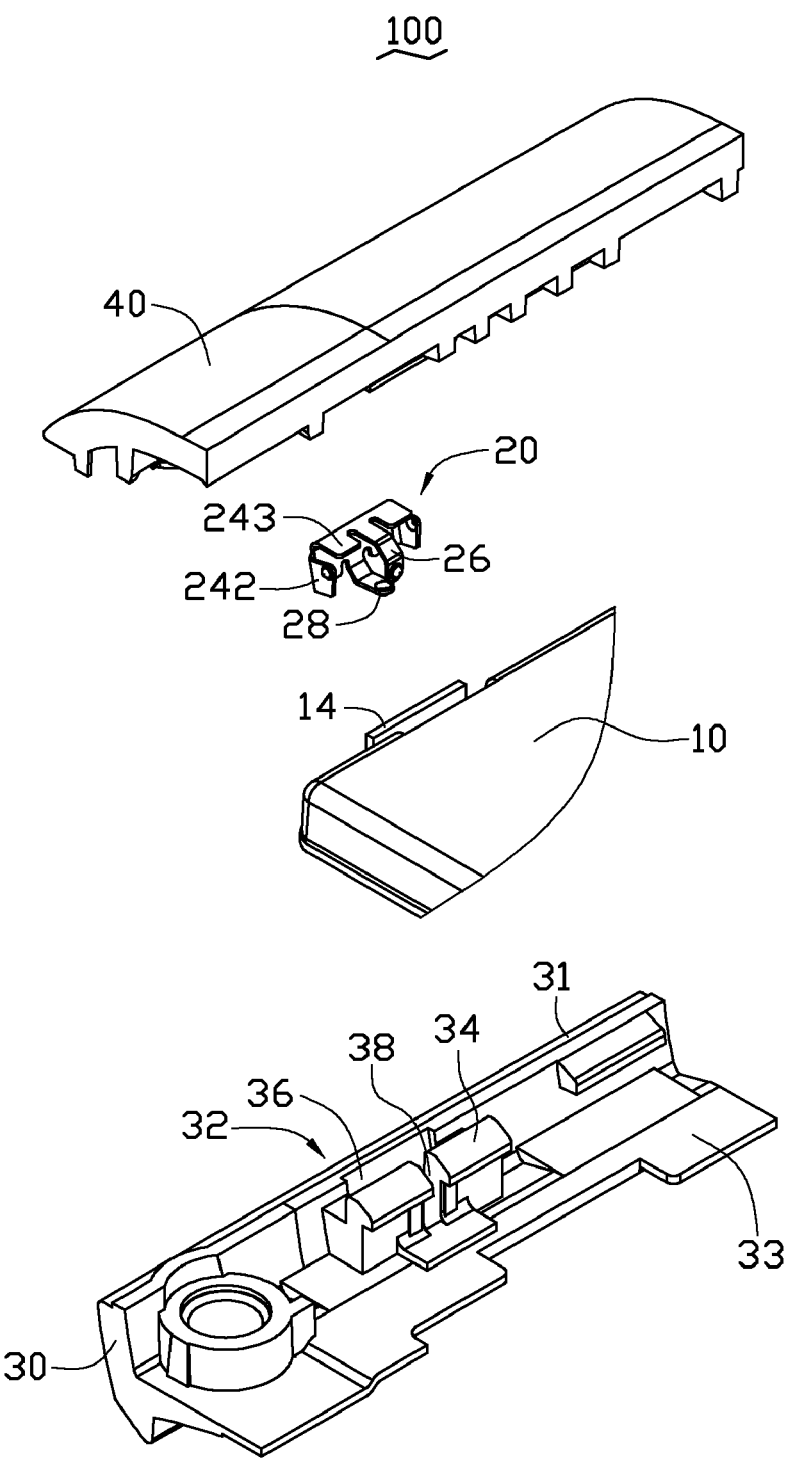
FIG. 2 is similar to FIG. 1, but shown from another aspect.

Referring to FIGS. 1 and 2, the mobile phone 100 includes a liquid crystal module 10 (partially shown), an elastic member 20, a first housing 30, and a second housing 40. The liquid crystal module 10 is disposed between the first housing 30 and the second housing 40. The elastic member 20 conducts electromagnetic charges from the liquid crystal module 10 to a ground pin of a printed circuit board (not shown) of the mobile phone 100.

The liquid crystal module 10 includes a first conductive element 14. The first conducive element 14 is made of metal, and is used for transferring electromagnetic charges away from the liquid crystal module 10.

Figure 3:
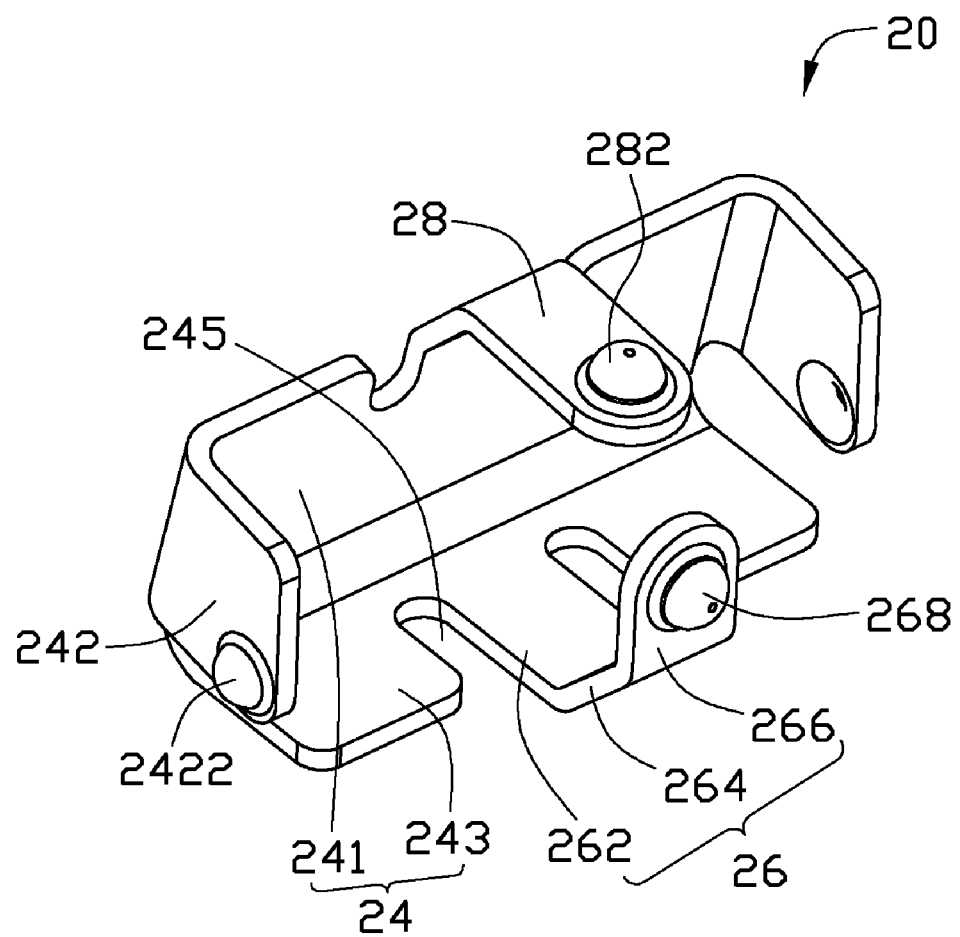
FIG. 3 is an enlarged view of an elastic member of FIG. 1.

Referring to FIG. 3, the elastic member 20 is metal, and may be stamped or punched from a metal sheet. The elastic member 20 includes a main base 24. The main base 24 includes a mounting portion 241 and a support portion 243 at an angle to the mounting portion 241. Two fixing portions 242 respectively perpendicularly extend from opposite sides of the mounting portion 241. A protrusion 2422 extends from each fixing portion 242. The support portion 243 defines an opening 245. A resisting portion 26 extends from the support portion 243 in the opening 245 configured to electrically connect to the first conductive element 14. The resisting portion 26 includes a holding part 262, a connecting part 264, and a contact part 266. The holding part 262 directly extends from the support portion 243, and is coplanar with the support portion 243. The connecting part 264 extends from the holding part 262 and is at an approximately obtuse angle to the holding part 262. The contact part 266 is inclined to the connecting part 264, and is opposite to the mounting portion 241. A substantially hemispherical first projection 268 is formed at the contact part 266. A latching portion 28 extends from the mounting portion 241 opposite to the support portion 243. A substantially hemispherical second projection 282 is formed at the latching portion 28.

The first housing 30 includes a sidewall 31 and a second conductive element 33. The second conductive element 33 is integrally formed with the first housing 30 by insert molding process. The first housing 30 includes a receiving portion 32 adjacent to the sidewall 31 for receiving the elastic member 20. The receiving portion 32 includes two spaced L-shape stopper plates 34. One end of each stopper plate 34 is integrally formed with the sidewall 31. A gap 38 is defined between the other ends of the stopper plates 34. The stopper plates 34 and the sidewall 31 cooperatively define a receiving groove 36. The elastic member 20 is configured to be engaged in the receiving groove 36. One portion of the second conductive element 33 is exposed from the receiving groove 36.

The second housing 40 is configured to be detachably attached to the first housing 30 for clamping the liquid crystal module 10 within. The second housing 40 includes a rib 42 configured for abutting against the elastic member 20.

Figure 4:
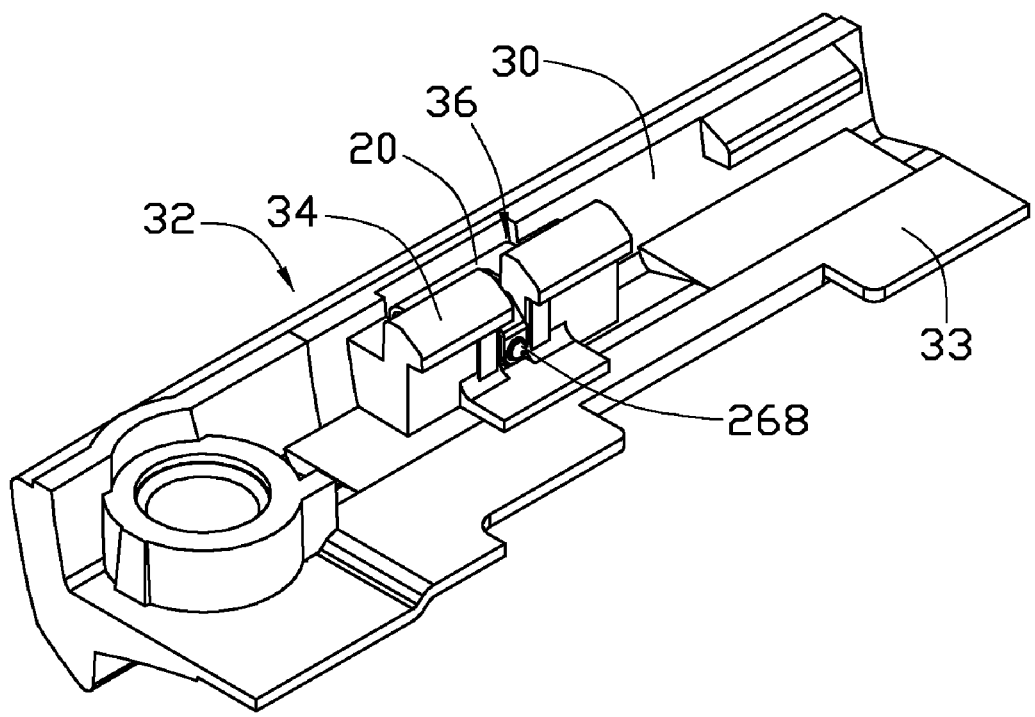
FIG. 4 is an assembled, schematic view of FIG. 1.
Figure 5:
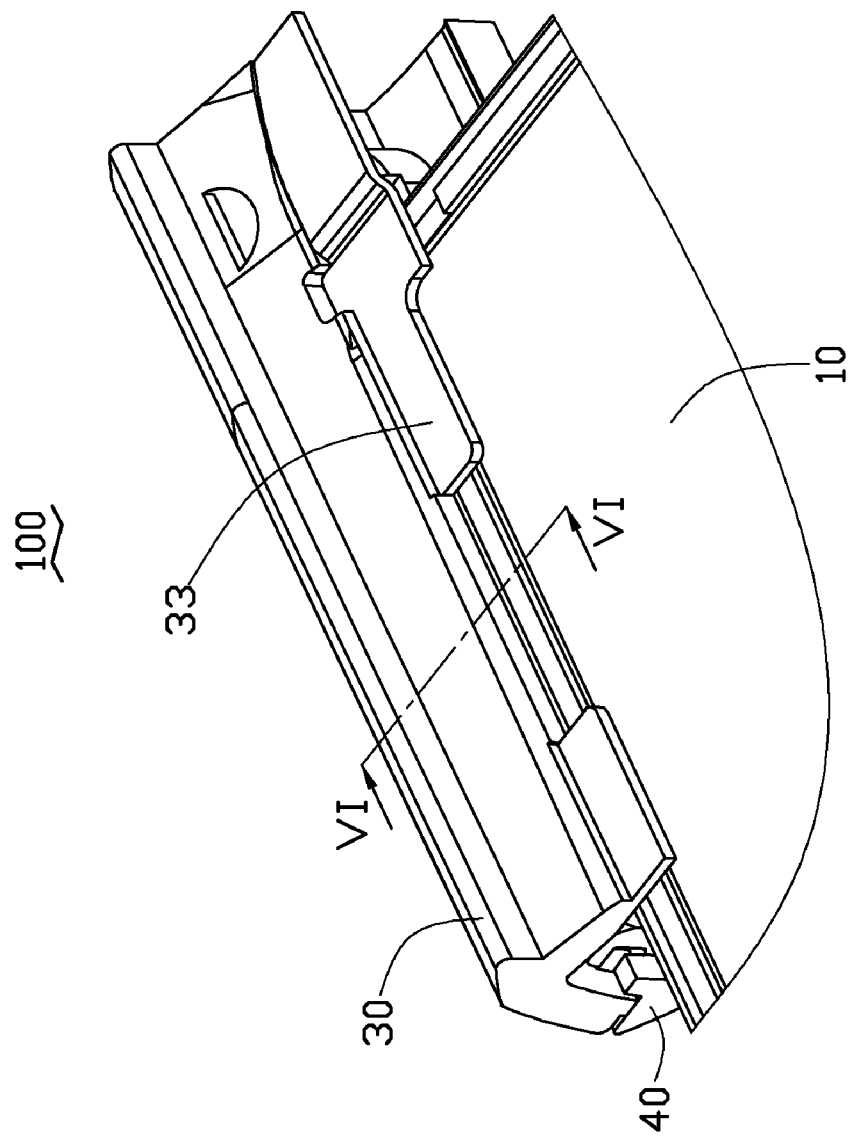
FIG. 5 is similar to FIG. 4, but shown from another aspect.
Figure 6:
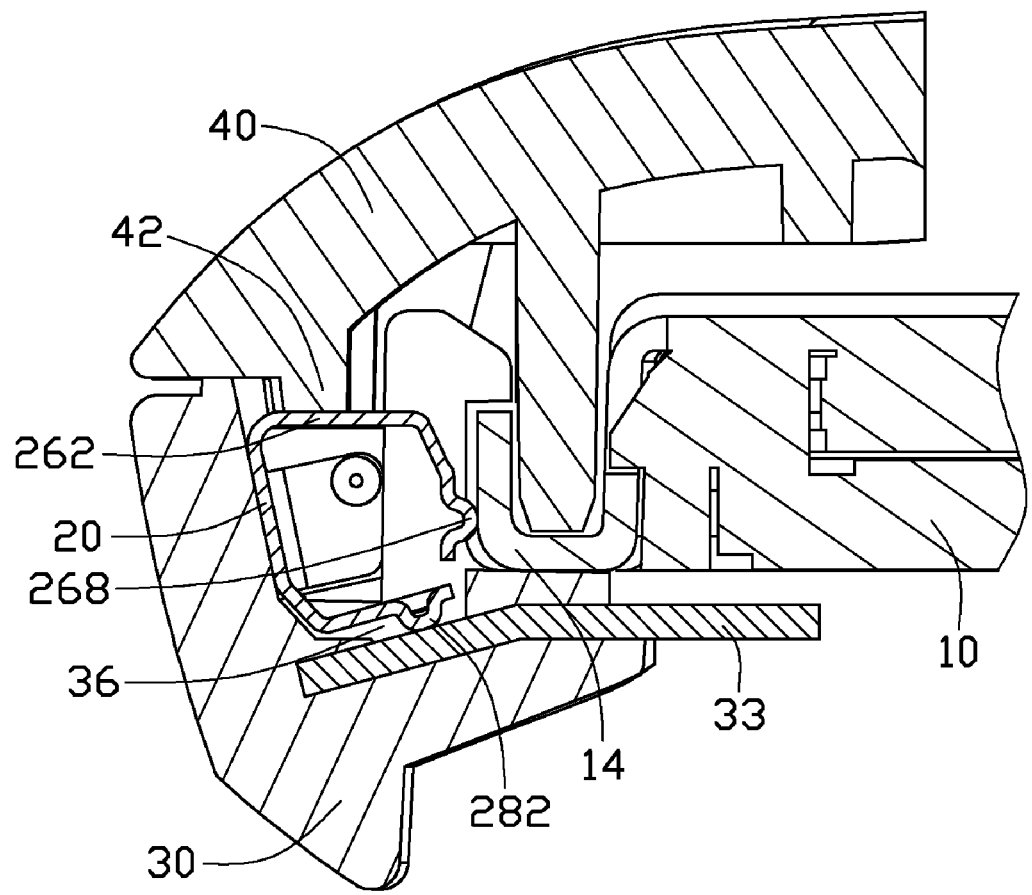
FIG. 6 is a cross-sectional view of FIG. 5 along VI-VI line thereof.

In assembly, referring to FIGS. 4 to 6, first, the elastic member 20 is inserted into the receiving groove 36. The mounting portion 241 contacts the sidewall 31. The fixing portions 242 respectively abut the stopper plates 34. The protrusions 2422 respectively elastically resist the stopper plates 34. Thus, the elastic member 20 is engaged in the receiving portion 32. The second projection 282 of the latching portion 28 is electrically connected to the second conductive element 33. The resisting portion 26 is exposed from the receiving groove 36, and is inserted into the gap 38. The contact part 266 is exposed from the gap 38. The liquid crystal module 10 is attached to the first housing 30. The first projection 268 is electrically connected to the first conductive element 14. After that, the second housing 40 is attached to the liquid crystal module 10. The rib 42 elastically resists the support portion 243 and the holding part 262. Therefore, the first conductive element 14, the elastic member 20, and the second conductive element 33 are electronically connected to a grounding pin of the printed circuit board.

A significant advantage of the grounding mechanism is that the elastic member 20 is easily assembled to the mobile phone 100. This simplifies assembly of the electronic device so that costs are reduced. In addition, when the second housing 40 is pressed downward, the first projection 268 and the second projection 282 may provide a more stable connection.

It is to be understood, however, that even though numerous characteristics and advantages of the present disclosure have been set forth in the foregoing description, together with details of assembly and function, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   a liquid crystal module;
   a housing,
   a grounding mechanism comprising:
   a first conductive element attached to the liquid crystal module;
   a second conductive element attached to the housing; and
   an elastic member attached to the housing, the elastic member including a main base, a resisting portion and a latching portion, the main base including a mounting portion and a support portion at an angle to the mounting portion, the resisting portion extending from the support portion, and the latching portion extending from the mounting portion opposite to the support portion, the resisting portion of the elastic member electronically connected to the second conductive element, the latching portion of the elastic member electronically connected to the first conductive element.

2. The electronic device as claimed in claim 1, wherein the main base is received in the housing.

3. The electronic device as claimed in claim 2, wherein two fixing portions respectively extend perpendicular to two sides of the mounting portion.

4. The electronic device as claimed in claim 1, wherein the resisting portion includes a holding part, a connecting part and a contact part, the holding part directly extends from the support portion, and is coplanar with the support portion, the connecting part extends from the holding part, and the contact part is inclined to the connecting part.

5. The electronic device as claimed in claim 4, wherein the connecting part is at an approximately obtuse angle to the holding part.

6. The electronic device as claimed in claim 4, wherein a first projection is formed at the contact part, and a second projection is formed at the latching portion.

7. An electronic device comprising:
   a liquid crystal module;
   a housing,
   a grounding mechanism comprising:
   a first conductive element attached to the liquid crystal module;
   a second conductive element attached to the housing; and
   an elastic member attached to the housing, the elastic member comprising:
   a main base received in the housing, the main base including a mounting portion and a support portion at an angle to the mounting portion, two fixing portions respectively extending perpendicular to two sides of the mounting portion;
   a resisting portion extending from the support portion and being electronically connected to the second conductive element; and
   a latching portion extending from the mounting portion opposite to the support portion being electronically connected to the first conductive element.

8. The electronic device as claimed in claim 7, wherein the resisting portion includes a holding part, a connecting part and a contact part, the holding part directly extends from the support portion, and is coplanar with the support portion, the connecting part extends from the holding part, and the contact part is inclined to the connecting part.

* * * * *